(12) United States Patent
Heyse

(10) Patent No.: US 9,969,275 B2
(45) Date of Patent: May 15, 2018

(54) METHOD AND DEVICE FOR OPERATING A VEHICLE

(71) Applicant: Robert Bosch GmbH, Stuttgart (DE)

(72) Inventor: Joerg Heyse, Besigheim (DE)

(73) Assignee: Robert Bosch GmbH, Stuttgart (DE)

(*) Notice: Subject to any disclaimer, the term of this patent is extended or adjusted under 35 U.S.C. 154(b) by 36 days.

(21) Appl. No.: 15/101,492

(22) PCT Filed: Nov. 17, 2014

(86) PCT No.: PCT/EP2014/074721
§ 371 (c)(1),
(2) Date: Jun. 3, 2016

(87) PCT Pub. No.: WO2015/082198
PCT Pub. Date: Jun. 11, 2015

(65) Prior Publication Data
US 2016/0303979 A1 Oct. 20, 2016

(30) Foreign Application Priority Data
Dec. 4, 2013 (DE) .................. 10 2013 224 896

(51) Int. Cl.
B60L 11/18 (2006.01)
G01C 21/34 (2006.01)
B60L 1/02 (2006.01)

(52) U.S. Cl.
CPC ............ B60L 11/18 (2013.01); B60L 1/02 (2013.01); G01C 21/3469 (2013.01); Y02T 10/7005 (2013.01)

(58) Field of Classification Search
None
See application file for complete search history.

(56) References Cited

U.S. PATENT DOCUMENTS 8,594,918 B2* 11/2013 Meyer-Ebeling ... B60L 11/1861
701/123
2012/0109408 A1 5/2012 Siy et al.
(Continued)

FOREIGN PATENT DOCUMENTS

CN 102282031 A 12/2011
CN 102695628 A 9/2012
(Continued)

OTHER PUBLICATIONS

English Translation KR20120073843A.*
(Continued)

*Primary Examiner* — Rami Khatib
(74) *Attorney, Agent, or Firm* — Michael Best & Friedrich LLP

(57) ABSTRACT

The invention relates to a method and to a device for operating a vehicle. The method comprises the steps: setting (S01; S01') a vehicle operating condition; detecting (S02; S02') first data signals that comprise information on first environmental parameters, including information on a first external temperature; detecting (S03; S03') second data signals that comprise information on vehicle-internal parameters, including information on a target vehicle interior temperature for the vehicle (F); calculating (S04; S04') an expected first partial air-conditioning power requirement for the vehicle (F) based at least on the first data signals, the second data signals, and a vehicle model of the vehicle (F), the calculated expected first partial air-conditioning power requirement comprising at least one power requirement, according to the vehicle model, for the provision of a vehicle interior temperature depending on the target vehicle interior temperature and depending on the first external temperature; calculating (S05; S05') at least one first additional expected partial power requirement for the vehicle (F); calculating (S06; S06') a first expected resulting power requirement; and (Continued)

operating (S07; S07') the vehicle (F) based on the determined first expected resulting power requirement, taking into account the set vehicle operating condition.

8 Claims, 3 Drawing Sheets

(56) References Cited

U.S. PATENT DOCUMENTS

| | | | | |
|---|---|---|---|---|
| 2013/0073113 A1* | 3/2013 | Wang | ................ | B60K 6/445 |
| | | | | 701/1 |
| 2013/0116868 A1* | 5/2013 | Erko | ................ | B60W 10/26 |
| | | | | 701/22 |
| 2013/0151046 A1* | 6/2013 | Choi | ................ | G01C 21/3469 |
| | | | | 701/22 |
| 2013/0238180 A1 | 9/2013 | Boeld et al. | | |
| 2013/0238189 A1* | 9/2013 | Michaelis | ........... | B60R 16/0236 |
| | | | | 701/36 |
| 2013/0332013 A1* | 12/2013 | Malone | ................ | B60H 1/004 |
| | | | | 701/22 |
| 2014/0046595 A1* | 2/2014 | Segawa | ................ | G01C 21/34 |
| | | | | 701/541 |
| 2016/0061616 A1* | 3/2016 | Meyer | ................ | G01C 21/3469 |
| | | | | 701/123 |

FOREIGN PATENT DOCUMENTS

| | | |
|---|---|---|
| CN | 102725169 A | 10/2012 |
| DE | 102011054457 | 5/2012 |
| DE | 102011116184 | 4/2013 |
| KR | 20120073843 | 7/2012 |

OTHER PUBLICATIONS

International Search Report for Application No. PCT/EP2014/074721 dated Mar. 26, 2015 (English Translation, 2 pages).

\* cited by examiner

METHOD AND DEVICE FOR OPERATING A VEHICLE

BACKGROUND OF THE INVENTION

The present invention relates to a method and a device for operating a vehicle, in particular an electric or hybrid vehicle. Electric or hybrid vehicles are those which operate the respective drive train thereof entirely or at least in part with electric energy.

In constructing and planning electric and hybrid vehicles and even vehicles having an internal combustion engine or having alternative energy sources, great importance is given to the efficient control or controllability of the respective vehicle. The efficient control or controllability particularly includes an efficient and most importantly an energy efficient operation of the vehicle. A multiplicity of information can be used for the operation of the vehicle, for example information regarding a past and current power requirement of the vehicle.

In the German patent application DE 10 2011 054 457 A1, a method and device for determining the cruising range of an electric vehicle are described. The method includes determining a value of useable battery energy and a power value which is required for heating or cooling a vehicle cab. The method determines a value of available battery energy on the basis of a value of useable battery energy and an estimated energy value for providing the heating and cooling of the vehicle cab. The method determines a value of recently consumed energy on the basis of an actual value of recently consumed HVAC energy, a value of recently consumed energy without HVAC system loads and a value of recently consumed energy with maximum HVAC system loads. The method determines a value for distance recently traveled and determines the range by dividing the value for distance recently traveled by the value of recently consumed energy and by multiplying the result by the value of useable battery energy.

SUMMARY OF THE INVENTION

The insight underlying the present invention is that a vehicle can be operated more efficiently, in particular in a more energy efficient manner, the more information is taken as a basis for operating the vehicle or the more detailed the information is, particularly with regard to environmental parameters that comprise parameters outside of the vehicle, which is taken as a basis for the vehicle operation.

In order to operate the vehicle in the sense of this application, the important factors are particularly, but not exclusively, a control of the vehicle drive, of the driving dynamics, of the driving speed and of the driving strategy, particularly in each case a control that is timely and adapted to the vehicle situation directly at hand. This can include electrically driven vehicles as well as vehicles operated by means of an internal combustion engine.

The operation of the vehicle further comprises the control of additional vehicle components, such as a navigation device, in order to provide a cruising range prediction that includes specifying a recommended average driving speed and the appropriate route for this purpose. In so doing, the driver can optionally select to follow the recommended route or respectively to activate the energy optimized and/or efficiency optimized automatic control of the vehicle drive.

If a route to be traveled is known to the vehicle, the operation of the vehicle can include a control of the drivetrain, the driving strategy and the driving speeds along the route to be traveled while taking the topology of the driving route into account, said control being optimized for the total energy usage. Such a route can, for example, be inputted or automatically determined by means of a navigation device of the vehicle or by means navigation equipment configured in the device according to the invention.

The concept underlying the present invention then takes into account the insight underlying the invention and calculates an expected partial air-conditioning power requirement for the vehicle which is based on vehicle-internal parameters as well as external parameters, i.e. environmental parameters. In other words, an operation of the vehicle which is efficiency- and/or energy-optimized takes place on the basis of a minimum total energy consumption which takes into account a power requirement for moving or respectively driving the vehicle, which can fall under the heading of an additional partial power requirement, as well as the partial air-conditioning power requirement.

The partial air-conditioning power requirement particularly refers to a partial power requirement which only has to be produced to air-condition the vehicle interior, i.e. to influence the environment thereof, from the energy supply of the vehicle in addition to all of the other power requirements. As a result, the heat which occurs or presumably will occur due to the operation of the drivetrain of the vehicle can, for example, advantageously be taken into account. In the case that the drivetrain, for example, generates more waste heat per unit of time than is required in total for heating the vehicle interior, the partial air-conditioning power requirement is thus zero, wherein, in this simple example, the power requirement for a HVAC blower is ignored. If the vehicle interior is to be heated to a certain target vehicle interior temperature, each person in the vehicle interior can contribute to reducing the partial air-conditioning power requirement due to his/her heat emission. If, on the other hand, the vehicle interior is to be cooled, each person in the vehicle interior can contribute to increasing the partial air-conditioning power requirement due to his/her heat emission.

When calculating the partial air-conditioning power requirement, a vehicle model for the vehicle is used which comprises information as to how the environmental parameters and the vehicle-internal parameters in combination can affect the partial air-conditioning power requirement for the vehicle. Thus, a precise calculation of the expected resulting power requirement for the vehicle is made possible, i.e. a better prognosis of the expected resulting power requirement is made possible. The vehicle can be operated with greater efficiency on the basis of this precise calculation or prognosis of the expected resulting power requirement.

The vehicle model comprises a plurality of formulas and cause-effect relationships, which particularly link the environmental parameters and the vehicle interior parameters. As a result, the vehicle model particularly describes an energy-related model. The vehicle model can also comprise a vehicle drive model, which, for example, includes a power requirement for the vehicle drivetrain as a function of vehicle-internal and/or environmental parameters. In addition, the vehicle drive model can describe the waste heat per unit of time as a function of an operating state of the vehicle drivetrain. The vehicle model can also comprise a person model, which, for example, describes average contributions of persons to vehicle-internal parameters, for example an influence on the vehicle interior humidity by perspiration, an influence on the vehicle interior temperature by body heat, etc. A largely physically based interior model for the vehicle interior can be used as a part of the vehicle model. Alternatively, a simplified approximation method can also be used.

For example, the requirement for thermal heating or cooling power in watts can be calculated with the following formula:

$$\dot{Q}_{stat} = \Delta T \cdot (122.068 + 0.0203 \cdot v),$$

wherein v is the driving speed in m/s and $\Delta T$ is a difference between a vehicle interior temperature and an external temperature in Kelvin. The two coefficients are by way of example and can as vehicle-internal parameters, e.g., be dependent on a vehicle type and on a current number of persons in the vehicle. Each can, for example, contribute to 100 watts of heat output in the vehicle interior. The coefficients can furthermore be dependent on environmental parameters, such as, for example, on a current intensity of the sun and on a current angle of incidence of the sun on the vehicle, whereby an additional heat output can result. The current number of persons, the intensity of the sun and/or the angle of incidence of the sun can also in additive terms be reflected in the formula above.

A possibly used motor heat and/or waste heat for heating or cooling the vehicle interior (for example by means of a thermally operated heat pump, e.g., by adsorption cooling) can be subtracted from the term above. The useable waste heat of the vehicle drive can be predicted in terms of thermal technology while taking into account a driving profile and/or the driving strategy (e.g. coasting). This can, for example, take place via a degree of efficiency of the vehicle drive and an empirical approach to heat losses of the drive assemblies to the environment.

An air conditioning of the vehicle interior may comprise dehumidifying the air. In this case the partial air-conditioning power requirement for the vehicle comprises a power requirement for the dehumidification, which can be dependent on vehicle-internal parameters, such as a vehicle interior humidity, the number of passengers (human perspiration), incoming air rate, outside air humidity, dew point temperature on the inside of a window pane (fogging of the window pane), an adjustable vehicle interior target humidity and/or a degree of efficiency of a dehumidifying device of the vehicle.

Upon beginning travel, a current vehicle interior temperature has to be determined in order to heat or cool the vehicle interior to a vehicle interior target temperature or to a temperature within a vehicle interior target temperature range. A total mass of the furnishings of the vehicle interior to be heated or to be cooled, a mass-averaged specific heat capacity for all articles to be heated or cooled in the vehicle interior and/or a degree of efficiency of a heating or cooling device (e.g. an air conditioning system or automatic climate control) can be taken into account as additional vehicle-internal parameters in such a calculation.

The first partial power requirement additionally to be expected can, for example, be a power requirement for the vehicle drive. Said first partial power requirement can also comprise or represent a power requirement or energy consumption by additional vehicle components or auxiliary consumers, for example headlights. If additionally required, the method according to the invention therefore also comprises a method for calculating a traveling speed and vehicle acceleration or respectively deceleration that is most energy-saving, wherein said latter method can be used for electric drives as well as drives for internal combustion engines.

According to the invention, a vehicle operating condition can be set which can also represent a logical chain-linking of individual conditions. Such an individual condition of the vehicle operating condition can, for example, be that the vehicle is to be operated in a particularly energy-saving manner. If the interior of the vehicle is not air-conditioned, the operation of the vehicle, in particular of the drivetrain of a moving vehicle, is usually more energy efficient the lower a speed of the vehicle is set. If however an air conditioning of the vehicle interior occurs or the climate in said vehicle interior is in general influenced, this simple situation can change.

A heat or respectively cold reservoir is, for example, necessary for the operation of an air-conditioning system of the vehicle. If the vehicle moves during travel, for example, at a lower speed, it can be the case that the waste heat generated by the drivetrain is too small to provide, for example, a desired target vehicle interior temperature. In this exemplary case, it may therefore be more energy-saving to set the speed of the vehicle to a higher speed so that the resulting power requirement for the vehicle is, as a sum of the partial air-conditioning power requirement and a partial power requirement for supplying the drivetrain of the vehicle, in total minimized, whereby the vehicle can be operated in an energy-saving manner in accordance with the vehicle operating condition.

According to the invention, the partial air-conditioning power requirement, i.e. the energy consumption of the vehicle due to the air conditioning of the vehicle interior (HVAC) is predicted as a function of the environmental parameters as well as a function of the vehicle-internal parameters and is subsequently used as the basis for operating the vehicle. As a result, an operation of the vehicle, in particular of the moving vehicle, which is optimized in terms of total energy usage can take place. The control of the drivetrain of the vehicle can be improved with regard to the total consumption, i.e. the resulting power requirement.

If, for example, a particularly large cruising range of the vehicle is desired within the scope of the vehicle operating condition, all functions of the vehicle can be operated with this condition in mind. This can be particularly advantageous for vehicles having an increasing degree of electrification. A cruising range prediction, i.e. a prediction of the range in kilometers or along a predetermined route of the vehicle can be improved on the basis at least of current angles of an energy store of the vehicle. On the basis of the improved cruising range prediction, the vehicle can in turn be operated more efficiently, for example, by a navigation device of the vehicle being automatically controlled to calculate a route comprising a particularly large cruising range.

The cruising range prediction along one or a plurality of routes can, for example, also be correlated with preprogrammed or currently retrievable information via available energy filling stations. The navigation device of the vehicle can thus be automatically controlled to specify a route, according to which the vehicle can travel within the predicted cruising range to one of the energy filling stations. Alternatively or additionally, a warning signal can be emitted if an energy filling station is not located along one or a plurality of routes within the predicted cruising range. Energy filling stations in this context can be conventional filling stations for combustible fuels, however also electric car charging stations.

The invention can be integrated into a navigation device or be coupled to a navigation device of the vehicle in an advantageous manner. Alternatively, navigation equipment having the features and functions of a navigation device can also be integrated into the device according to the invention.

According to one preferred modification to the invention, the method according to the invention furthermore comprises the step: detecting third data signals that comprise information on a first route for the vehicle, wherein the set vehicle condition comprises a destination position and the first route is a route from a starting position of the vehicle to a destination position. The third data signals can, for example, be emitted from a navigation device of the vehicle, to which the destination position was provided. In so doing, the environmental parameters comprise environmental parameters along the first route and the first external temperature is a current or an expected, i.e. predicted, external temperature on at least one section of the first route. That means the first data signals can comprise information on a progression of external temperatures along the entire first route. According to this modification, the method furthermore has the step: calculating a first expenditure of energy of the vehicle along the first route based on a progression of the determined first expected resulting power requirement along the first route.

That means the first expected resulting power requirement is calculated for one of a plurality of points along the first route or also for all points along the first route. Using an expected temporal position progression of the vehicle along the first route, the entire energy expenditure of the vehicle along the first route can be calculated from the progression of the resulting power requirement.

The temporal position progression of the vehicle can take place on the basis of an average speed in an elapsed period of time, for example a half an hour. Information on allowed and/or possible speeds for the vehicles along the first route can also be used, for example by a navigation device of the vehicle, as the basis for a diagnosis of the expected temporal position progression of the vehicle. A data bank comprising predetermined or preprogrammed data comprising information on a driving behavior of a user can furthermore additionally or alternatively be used.

The vehicle is operated based on the calculated first expenditure of energy and while taking into account the destination position. Thus, as a function of a desired destination position, the vehicle can be operated in an efficiency-optimized and energy-saving manner. In so doing, a currently available energy reserve of the vehicle can be compared to the calculated first expenditure of energy. On the basis of the comparison, vehicle-internal parameters can automatically be changed in the event that achieving the destination position while taking into account the available residual energy quantity requires such an intervention. For example, the target vehicle interior temperature could be reduced to a predetermined or adjustable minimum value.

According to a further preferred modification to the method according to the invention, the first data signals furthermore comprise information on at least one of the following: a time of day, a calendar date, an airflow, weather conditions on at least one first section along the first route, a humidity on at least one second section along the first route and/or an incident solar radiation on at least one third section along the first route. Hence, the expected first partial air-conditioning power requirement for the vehicle can be especially precisely calculated, whereby the vehicle can be operated more efficiently. The first, second and third section of the first route can in each case be the same, however also overlapping or completely different from one another.

So many of the aforementioned environmental parameters as possible are advantageously taken into account, for example all which can be received via a wireless communication interface. From the time of day and the calendar date, it can be determined on the basis of the current first external temperature which external temperature is to be expected on a certain section along the first route. The airflow, the weather conditions, for example rain or snow, the humidity and the incident solar radiation are all factors which, in certain circumstances, can significantly increase or decrease the expected first partial air-conditioning power requirement.

According to a further preferred modification to the method, the second data signals comprise information on at least one of the following vehicle-internal parameters: a current number of persons in the vehicle, a target speed specified to a cruise control of the vehicle, a target speed range specified to the cruise control of the vehicle, a current vehicle interior temperature, a current vehicle interior humidity, a current vehicle interior $CO_2$ content, a current energy reserve of the vehicle and/or an inside temperature of a window pane of the vehicle. These and other vehicle-internal parameters can, in certain circumstances, significantly influence the expected first partial air-conditioning power requirement for the vehicle. So many of these vehicle-internal parameters as possible are advantageously detected and taken into account when calculating the expected first partial air-conditioning power requirement. This calculation can therefore be carried out in a particularly precise manner and the vehicle can be operated accordingly particularly efficiently.

According to a further preferred embodiment of the method, the vehicle model comprises information on at least one of the following: a power requirement of the vehicle when a light of the vehicle is switched on, a power requirement of a drivetrain of the vehicle as a function of a composition of a street, a fuel consumption of the drivetrain of a vehicle as a function of the power requirement of the drivetrain, a vehicle mass, a degree of efficiency of the drivetrain and/or a power requirement of the vehicle for the provision of a certain vehicle interior humidity of the vehicle as a function of an external humidity and/or a vehicle interior humidity.

According to a further preferred modification to the invention, the method furthermore comprises the steps: detecting fourth data signals which comprise information on a second route, wherein the second route is a route different from the first route from the starting position of the vehicle to the destination position; detecting fifth data signals which comprise information on second environmental parameters along the second route, including information on at least one second external temperature on at least one section along the second route; calculating an expected second partial air-conditioning power requirement for the vehicle along the second route based on the second data signals, the fifth data signals and the vehicle model for the vehicle, wherein the calculated second partial air-conditioning power requirement comprises at least one power requirement for the provision of the vehicle interior temperature as a function of the target vehicle interior temperature and as a function of the at least one second external temperature; calculating at least one second additional expected partial power requirement for the vehicle; calculating a second expected resulting power requirement as a sum of the second partial air-conditioning requirement and the at least one second additional partial power requirement; calculating, on the basis of a progression of the determined second expected resulting power requirement along the second route, a second expenditure of energy of the vehicle along the second route; and determining an optimal route having a minimal expenditure of energy for the vehicle from a set comprising the first and the at least one second route, the vehicle being operated based on the determined optimal route.

Thus, the vehicle can, for example, be operated in such a way that a navigation device of the vehicle is actuated to automatically indicate the determined optimal route.

According to a further preferred modification to the invention, the method comprises the additional step: determining a cruising range of the vehicle along at least the first route, based on a current energy reserve of the vehicle and at least the calculated first expected resulting power requirement of the vehicle along at least the first route. The second data signals further comprise at least items of information on the current energy reserve of the vehicle. The vehicle is operated on the basis of the determined cruising range of the vehicle. One or a plurality of the vehicle-internal parameters can, for example, be changed by means of a control device of the vehicle. It can therefore be ensured that the vehicle can cover the entire route with the current energy reserve.

According to a further preferred modification to the invention, the second data comprise information on a predetermined target speed range for the vehicle. Furthermore, the first additional expected partial power requirement for the vehicle is calculated for each speed value of speeds within the predetermined target speed range. In addition, the first additional expected resulting power requirement is calculated for each speed value of speeds within the predetermined target speed range as a sum of the calculated expected first partial air-conditioning power requirement and the respective first additional expected partial power requirement for the vehicle (in accordance with the speed value). The method furthermore comprises the additional step: determining that speed within the target speed region for which the smallest first expected resulting power requirement for the vehicle was calculated. The operation of the vehicle can comprise setting the current speed of the vehicle to the determined speed within the target speed range. Alternatively, the vehicle can also be operated such that, for example, a display device outputs the determined speed as a recommendation.

According to one preferred modification to the device according to the invention, the second data detection device comprises a wireless communication interface for receiving at least some of the second data signals. Hence, information from the internet can, for example, be regularly or constantly accessed, for example information from a weather service.

Second data signals concerning route-dependent external temperatures, humidity and incident solar radiation can be read in via the internet or respectively Ethernet.

BRIEF DESCRIPTION OF THE DRAWINGS

The present invention is subsequently explained in detail with the aid of the exemplary embodiments depicted in the schematic figures of the drawings. In the drawings.

In the figures of the drawings, identical or functionally identical elements and devices—unless otherwise specified—are provided with the same reference signs.

DETAILED DESCRIPTION

Figure 1:
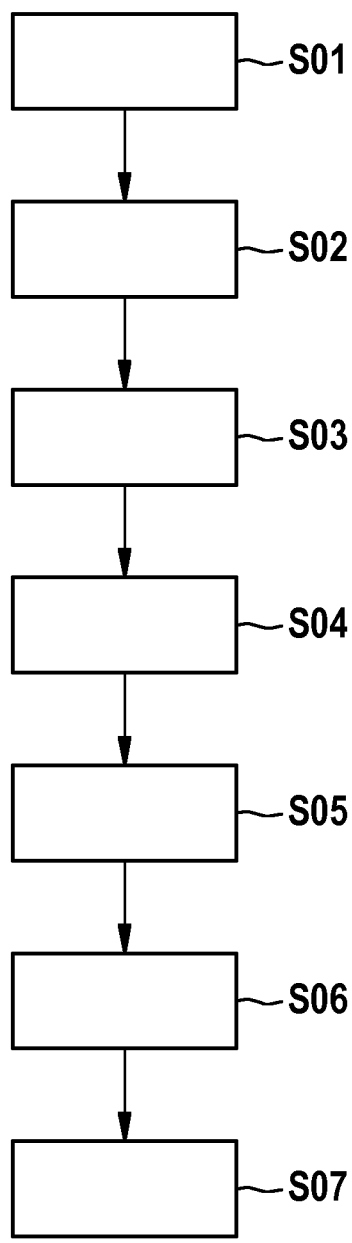
FIG. 1 shows a flow diagram for explaining a method for operating a vehicle pursuant to a first embodiment of the present invention.

FIG. 1 shows a schematic flow diagram for explaining a method for operating a vehicle pursuant to a first embodiment of the present invention.

The first embodiment is purposely selected to be as simple as possible in order to clarify the principle. It is to be understood that, instead of the described environmental and vehicle-internal parameters which have been taken into account, a plurality of such parameters can be taken into account in each case and that furthermore a plurality of calculations of different partial power requirements that are dependent on one another can occur.

In step S01, a vehicle operating condition for the vehicle F is set. In the first embodiment, the vehicle operating condition is that the vehicle F is to be operated in an energy-optimized manner.

In step S02, first data signals that comprise information on first environmental parameters are detected. According to the first embodiment, the environmental parameters relate to a first external temperature, which is a current external temperature in the immediate proximity of the vehicle F.

In step S03, second data signals which comprise information on vehicle-internal parameters are detected. According to the first embodiment, the vehicle-internal parameters relate to a predetermined target speed range for the vehicle F, a target vehicle interior temperature and a current vehicle interior temperature of the vehicle F. The target speed range and/or the target vehicle interior temperature are, for example, predetermined by a user of the vehicle F.

A minimum speed can also be predefined by the user, whereas a maximum speed can be determined with the aid of a dynamic map as the legally maximally allowed speed at the current position of the vehicle F. The target speed range can thus be defined as being between the minimum speed and the maximum speed, for example between 100 km/h and 120 km/h.

In step S04, a plurality of expected partial air-conditioning power requirements is calculated for the vehicle F, respectively one for each acquired speed of the vehicle F in integer km/h within the target speed range, including the limits. In the present example, twenty one expected partial power requirements are thus calculated.

According to the first embodiment, a vehicle model is used in order to initially calculate how high the expected waste heat per unit of time of a drivetrain of the vehicle is at each of the acquired speeds. To this end, information is in turn deposited in the vehicle model as to which first power output of the drivetrain is in each case necessary for the provision of the acquired vehicle speed as a function of additional parameters and as to which degree of efficiency the drivetrain has.

Furthermore, a calculation is made with the aid of the vehicle model as to which second power output is necessary for heating the vehicle interior from the current vehicle interior temperature to the target vehicle interior temperature and/or for maintaining the current vehicle interior temperature at the level of the target vehicle interior temperature, wherein the current external temperature is taken into account.

In step S05, a first additional expected partial power requirement for the vehicle F is calculated. According to the first embodiment, the first additionally expected partial power requirement is the first power output which is necessary for the provision of the acquired vehicle speed as a function of further parameters by the drivetrain.

In step S06, an expected resulting power requirement is calculated—for each acquired speed—as a sum of the calculated expected partial air-conditioning power requirement and the additional partial power requirement. In the present case, the resulting power requirement is in each case the sum of the first power output and the second power output minus the waste heat per unit of time of the drivetrain.

In a further step, that speed of the acquired speeds within the target speed range is determined, for which the smallest expected resulting power requirement for the vehicle F was calculated.

In a further step S07, a current speed of the vehicle F is set, for example by means of a cruise control of the vehicle, to the determined speed within the target speed range. The method according to the first embodiment can be carried out not only upon request of a user, for example when changes are made by the user to the target speed range, but also continuously. It is also conceivable that the method is then always carried out if a navigation device reports that the legally maximum allowed speed has changed.

Figure 2:
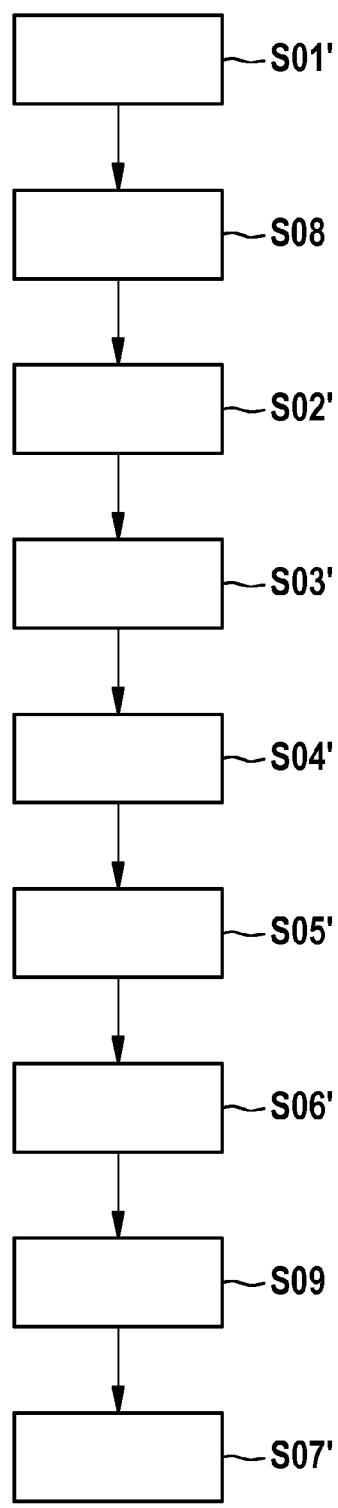
FIG. 2 shows a schematic flow diagram for explaining a method for operating a vehicle pursuant to a second embodiment of the present invention.

FIG. 2 shows a schematic flow diagram for explaining a method for operating a vehicle according to a second embodiment of the present invention.

According to the second embodiment, the vehicle operating condition is detected in step S01' as a result of a destination position for the vehicle F being predefined.

In step S08, third data signals are detected which comprise information on a first route for the vehicle F. The first route is a navigable route for the vehicle F from a current position of the vehicle to the destination position. The third data signals can, for example, be emitted from a navigation device of the vehicle as a reaction to the destination position transmitted to the navigation device and can thus be detected.

In step S02', the first data signals are detected which comprise according to the second embodiment information on first external temperatures along all points of the first route. Such information can, for example, be received by a weather service or something similar via a wireless communication interface 17. The first data signals furthermore comprise information on expected possible speeds for the vehicle along the first route. This information can, for example, be emitted by the navigation device of the vehicle; said information can, however, also be received, for example, by a traffic information service or something similar via the wireless communication interface 17.

In step S03', the second data signals are detected, which contain a value for the target vehicle interior temperature and a current vehicle interior temperature, i.e. a value for the current vehicle interior temperature, of the vehicle F.

In step S04', the expected first partial air-conditioning power requirement for the vehicle is calculated for each point along the first route. On the basis of the vehicle model, the current vehicle interior temperature, the target vehicle interior temperature and the expected possible speed of the vehicle are included in the calculation correspondingly at each point. The calculation S04' takes place analogously to the calculation S04 according to the first embodiment, wherein, in contrast to the first embodiment, the expected possible speed and the prevailing external temperature are respectively inserted at each point into the vehicle model instead of the speeds in the predefined target speed range and the current external temperature.

According to the second embodiment, the vehicle model is used in order to initially calculate how high the expected waste heat per unit of time of the drive train of the vehicle is at each of the expected possible speeds. To this end, it can in turn be calculated with the aid of the vehicle model which third power output of the drivetrain is necessary in each case for the provision of the expected possible vehicle speed at each point as a function of additional parameters and what degree of efficiency the drivetrain has.

It can furthermore be calculated with the aid of the vehicle model which fourth power output is necessary for heating the vehicle interior from the current vehicle interior temperature to the target vehicle interior temperature and/or for maintaining the current vehicle interior temperature at the level of the target vehicle interior temperature, the external temperature being taken into account at each point.

In step S05', a first additional expected partial power requirement for the vehicle F is calculated for each point along the first route. In the second embodiment, the first additionally expected partial power requirement is the third power output plus an additional partial power requirement for further vehicle components, such as, for example, multimedia devices, power windows, etc.

In step S06', an expected resulting power requirement is calculated—for each point along the first route—as the sum of the calculated expected partial air-conditioning power requirement at the point and the additional partial power requirement at the point. Analogous to the first embodiment, the resulting power requirement at each point is in each case the sum of the third power output and the fourth power output minus the expected waste heat per unit of time of the drivetrain at the point.

In step S09, a first expected expenditure of energy of the vehicle F along the first route is calculated on the basis of a progression of the determined first expected resulting partial power requirement at each point along the first route. To this end, the progression can, for example, be integrated as a function of time.

In step S07', the vehicle is operated based on the determined first expected resulting power requirement while taking into account the set vehicle operating condition. The expected first expenditure of energy is compared to a current energy reserve of the vehicle F. If the current energy reserve is less than the expected first expenditure of energy, a warning signal is emitted. A display of the vehicle, for example a warning light, can be operated based on the warning signal. Additional steps can, however, also be taken, such as, for example, the automatic separating of some or all of the additional vehicle components of the vehicle F from a power supply, for example until the recalculated expected first expenditure of energy is less than the then current energy reserve after the method has again been run through.

Figure 3:
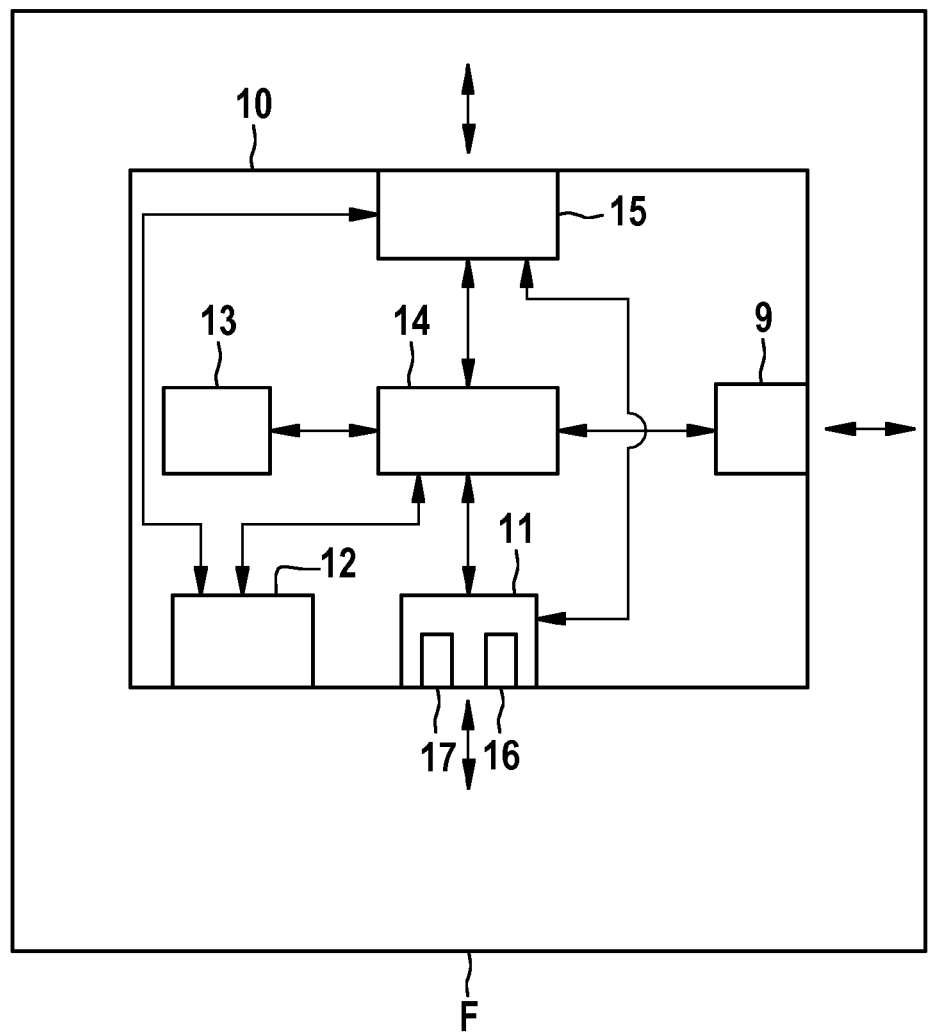
FIG. 3 shows a schematic block diagram for explaining a device according to the invention for operating a vehicle pursuant to a third embodiment of the present invention.

FIG. 3 shows a schematic block diagram for explaining a device 10 for operating a vehicle F pursuant to a third embodiment of the present invention. The device 10 is only briefly described here. The functions of the different equipment of the device 10 as well as numerous modifications and variants are described above in detail also in reference to the methods according to the first and second embodiment. It goes without saying that the device 10 for the provision of the described modifications and variants can be modified.

The device 10 is configured inside a vehicle F and comprises an input means 9. This can, for example, relate to a touchscreen or an interface, for example to communicate with a mobile telephone.

The device further comprises a first data detection device 11 designed to detect S02; S02' first data signals which comprise information on first environmental parameters, including information on a first external temperature. According to the third embodiment, the first data detection device 11 comprises a temperature sensor 16 on an external side of the vehicle F as well as a wireless communication interface 17 for receiving at least some of the first data signals. The wireless communication interface 17 can be designed for an Ethernet connection, for receiving radio signals, etc.

The device further comprises a second data detection device 12, which is designed to detect S03; S03' second data signals which comprise information on vehicle-interior parameters, including information on a target vehicle interior temperature for the vehicle F. The second data detection device 12 can, for example, comprise an automatic climate control and/or a navigation device. This can also relate to a touchscreen, rotating head or a slide control.

The device further comprises a storage device 13 at least for storing a vehicle model for the vehicle F, wherein the vehicle model comprises information on a power requirement of the vehicle F for a provision of a vehicle interior temperature as a function of the target vehicle interior temperature as a function of the first external temperature. Possible configurations of the vehicle model are explained above in detail.

The device further comprises a computing device 14 designed to calculate S04; S04' an expected first partial air-conditioning power requirement for the vehicle F based on at least the first data signals, the second data signals and the vehicle model for the vehicle F, wherein the calculated expected first partial air-conditioning power requirement comprises at least the power requirement for the provision of the vehicle interior temperature as a function of the target vehicle interior temperature and as a function of the first external temperature.

The computing device 14 is further designed to calculate S05; S05' at least one first additional expected partial power requirement for the vehicle F and to calculate S06; S06' a first expected resulting power requirement as the sum of the first partial air-conditioning power requirement and the at least one first additional partial power requirement.

A control device 15 of the device 10 is designed to operate S07; S07' the vehicle F based on the determined first expected resulting power requirement while taking into account the vehicle operating condition.

Although the present invention was described above using preferred exemplary embodiments, said invention is not limited thereto but can be modified in a variety of ways. The invention particularly can be changed or modified in a number of ways without deviating from the gist of the invention.

If reference is made in this description to a navigation device, it should thereby be understood that said navigation device can relate to a navigation device coupled to the inventive device within the vehicle or respectively to a navigation assistance system as well as to navigation equipment contained in the device. Such navigation equipment can be equipped with all functions and features of a separate navigation device or respectively navigation assistance system.

As an option, a power requirement or an energy consumption of auxiliary consumers used for air dehumidification, heating a window pane and/or mirror, heating a seat and/or heating incoming air can be separately calculated and/or separately outputted. Said power requirement of auxiliary consumers can be outputted to the control device of the vehicle and/or to a display device, which is configured inside of the vehicle. Hence, an even more exact calculation or prediction of the power requirement or respectively energy consumption is possible and consequently an energy-optimized control of the drivetrain of the vehicle is also possible.

Additionally or alternatively, an energy savings potential, i.e. a reduction in the partial air-conditioning load requirement by operating an automatic climate control, for example an HVAC, can be calculated in the air recirculation mode as the vehicle operating condition. Operating S07 the vehicle 7 can comprise the automatic setting of the air recirculation mode with optimized air recirculation mode parameters as a function of a degree of vehicle interior humidity, a window pane inside temperature, a current number of passengers and/or a $CO_2$ content in the vehicle interior as vehicle-internal parameters.

Alternatively or additionally, operating S07; S07' the vehicle can entail a recommendation for the air recirculation mode comprising the optimized air recirculation parameters being offered to the user of the vehicle F. The set air recirculation mode can be taken into account as a vehicle-internal parameter when the method according to the invention is re-executed.

The vehicle model for the vehicle can be designed in a user specific manner. For example, a user profile can be programmable and/or selectable, according to which one or a plurality of features of the vehicle model is changed in comparison to a general profile that is not user specific. For example, an average fuel consumption or expenditure of energy per kilometer traveled with the vehicle can be different for different users. In an advantageous manner, the vehicle model can also be designed specifically for a certain vehicle type.

If, during the course of the method according to the invention, an expected expenditure of energy is, for example, calculated along a route, a check can be automatically made, for example by means of a navigation device of the vehicle, whether this route actually has been covered. If the route was covered, the energy actually expended can be calculated by comparing an energy reserve at the beginning of the route to an energy reserve after the route has been covered. The actual expenditure of energy can be compared to the calculated expected energy expenditure and the vehicle model can be automatically adjusted based on the result of the comparison. The vehicle model can furthermore be continuously adjusted by a total expenditure of energy of the automatic climate control being read out, for example, over a plurality of driving situations, driving routes, driving days, times of day and seasons and by said total expenditure of energy being correlated with the input variables responsible for it via half-empirical, functional correlations.

The vehicle operating condition can determine a comfort level from a list of comfort levels which can be selected by users of the vehicle F and have an average power requirement that rises within the list, each comfort level specifying a collection of allowed value ranges for the vehicle-internal parameters.

The invention claimed is:

1. A method for operating a vehicle, the method comprising:
   setting (S01; S01') a vehicle operating condition;
   detecting (S02; S02') first data signals that comprise information on first environmental parameters, including information on a first external temperature;
   detecting (S03, S03') second data signals that comprise information on vehicle-internal parameters, including information on a target vehicle interior temperature for the vehicle (F);
   calculating (S04; S04') an expected first partial air-conditioning power requirement for the vehicle (F) based at least on the first data signals, the second data signals and a vehicle model of the vehicle (F), the calculated expected first partial air-conditioning power requirement comprising at least one power requirement, according to the vehicle model, for a provision of a vehicle interior temperature as a function of the target vehicle interior temperature and as a function of the first external temperature;

calculating (S05; S05') at least one first additional expected partial power requirement for the vehicle (F);

calculating (S06; S06') a first expected resulting power requirement as the sum of the calculated expected first partial air-conditioning power requirement and the at least one first additional partial power requirement;

operating (S07; S07') the vehicle (F) based on the determined first expected resulting power requirement while taking into account the set vehicle operating condition;

detecting (S08) third data signals that include information on a first route for the vehicle (F);

wherein the set vehicle operating condition includes a destination position and the first route is a route from a start position of the vehicle to the destination position;

wherein the first environmental parameters along the first route comprise the first external temperature and said first external temperature is an external temperature on at least one section of the first route; and calculating (S09) a first expenditure of energy of the vehicle (F) along the first route based on a progression of the determined first expected resulting power requirement along the first route, operating (S07) the vehicle (F) on the basis of the first energy expenditure and while taking into account the destination position;

detecting of fourth data signals which include information on a second route; wherein the second route is a route from the starting position of the vehicle to the destination position which is different from the first route;

detecting fifth data signals which include information on second environmental parameters along the second route, including information on at least one second external temperature on at least one section along the second route;

calculating an expected second partial air-conditioning power requirement for the vehicle (F) along the second route based on the second data signals, the fifth data signals and the vehicle model of the vehicle (F), wherein the calculated second partial air-conditioning power requirement includes at least one power requirement for the provision of the vehicle interior temperature as a function of the target vehicle interior temperature and as a function of the at least one second external temperature;

calculating at least one second additional expected partial power requirement for the vehicle (F);

calculating a second expected resulting power requirement as the sum of the second partial air-conditioning power requirement and the at least one second additional partial power requirement;

calculating a second expenditure of energy of the vehicle (F) along the second route based on a progression of the determined second expected resulting power requirement along said second route; and determining an optimal route having a minimal expenditure of energy for the vehicle (F) from a set comprising the first and the at least one second route; wherein the vehicle (F) is operated based on the defined optimal route.

2. The method according to claim 1, wherein the first data signals include information on at least one of the following environmental parameters: a time of day, a calendar date, an airflow, weather conditions on at least one first section along the first route, the humidity on at least one second section along the first route, and an incident solar radiation on at least one third section along the first route.

3. The method according to claim 1, wherein the second data signals include information on at least one of the following vehicle-internal parameters: a current number of persons currently in the vehicle (F), a target speed specified to a cruise control of the vehicle (F) or a target speed range specified to the cruise control of the vehicle (F), a current vehicle m energy reserve of the vehicle (F), and an inside window pane temperature of a window pane of the vehicle.

4. The method according to claim 1, wherein the vehicle model includes information on at least one of the following: a power requirement of the vehicle (F) when a light of the vehicle (F) is switched on, a power requirement of a drivetrain of the vehicle (F) as a function of a speed of the vehicle, a power requirement of the drivetrain of the vehicle (F) as a function of the composition of the street, a fuel consumption of the drivetrain of the vehicle (F) as a function of the power requirement of the drivetrain, a vehicle mass, a degree of efficiency of the vehicle (F), and a power requirement of the vehicle (F) for the provision of a determined vehicle internal humidity of the vehicle (F) as a function of an external humidity.

5. The method according to claim 1 comprising the additional steps:

determining a cruising range of the vehicle (F) along at least the first route based on a current energy reserve of the vehicle and based on at least the calculated first expected resulting power requirement of the vehicle (F) along at least the first route; wherein the second data signals include at least information on the current energy reserve of the vehicle (F); the vehicle (F) being operated based on the determined cruising range of the vehicle (F).

6. The method according to claim 1, wherein the second data comprise information on a predetermined target speed range for the vehicle (F);

wherein the first additional expected partial power requirement for the vehicle (F) is calculated for each speed value of speeds within the predetermined target speed range;

wherein, for each speed value of speeds within the predetermined target speed range, the first additional expected resulting power requirement is calculated as the sum of the calculated expected first partial air-conditioning power requirement and the respective first additional expected partial power requirement for the vehicle in accordance with the speed value; and wherein the method furthermore comprises the step:

determining that speed within the target speed range, for which the smallest first expected resulting power requirement for the vehicle (F) was calculated; and wherein operating (S07) the vehicle includes setting the current speed of the vehicle (F) to the determined speed within the target speed range.

7. A device (10) for operating a vehicle (F) comprising:

an input means (9) configured on the vehicle, a first data detection device (11) configured on the vehicle (F), a second data detection device (12) configured on the vehicle (F), a storage device (13) configured on the vehicle (F), a computing device (14) configured on the vehicle (F) a control device (15) configured on the vehicle (F) and a navigation device;

wherein the input means (9) is configured to set (S01) a vehicle operating condition;

wherein the first data detection device (11) is configured to detect (S02; S02') first data signals which included information on first environmental parameters, including information on a first external temperature;

wherein the second data detection device (12) is configured to detect (S03, S03') second data signals which included information on vehicle-internal parameters, including information on a target vehicle interior temperature for the vehicle (F);

wherein the storage device (13) is configured to store a vehicle model of the vehicle (F), the vehicle model comprising information on a power requirement of the vehicle (F) for the provision of a vehicle interior temperature as a function of the target vehicle interior temperature and as a function of the first external temperature;

wherein the computing device (14) is configured to calculate (S04; S04') an expected first partial air-conditioning power requirement for the vehicle (F) based at least on the first data signals, the second data signals and the vehicle model of the vehicle (F), wherein the calculated expected first partial air-conditioning power requirement includes at least the power requirement for the provision of the vehicle interior temperature as a function of the target vehicle interior temperature and as a function of the first external temperature;

wherein the computing device (14) is further configured to calculate (S05; S05') at least one first additional expected partial power requirement for the vehicle (F) and to calculate (S06; S06') a first expected resulting power requirement as the sum of the first partial air-conditioning power requirement and the at least one first additional partial power requirement; and wherein the control device (15) is configured to operate (S07; S07') the vehicle (F) based on the determined first expected resulting power requirement while taking into account the vehicle operating condition;

the navigation device generating (S08) third data signals that include information on a first route for the vehicle (F);

wherein the set vehicle operating condition includes a destination position and the first route is a route from a start position of the vehicle to the destination position;

wherein the first environmental parameters along the first route comprise the first external temperature and said first external temperature is an external temperature on at least one section of the first route; and computing device (14) calculating (S09) a first expenditure of energy of the vehicle (F) along the first route based on a progression of the determined first expected resulting power requirement along the first route, the computing device (14) operating (S07) the vehicle (F) on the basis of the first energy expenditure and while taking into account the destination position;

the navigation device generating fourth data signals which include information on a second route; wherein the second route is a route from the starting position of the vehicle to the destination position which is different from the first route;

the navigation device generating fifth data signals which include information on second environmental parameters along the second route, including information on at least one second external temperature on at least one section along the second route;

the computing device (14) calculating an expected second partial air-conditioning power requirement for the vehicle (F) along the second route based on the second data signals, the fifth data signals and the vehicle model of the vehicle (F), wherein the calculated second partial air-conditioning power requirement includes at least one power requirement for the provision of the vehicle interior temperature as a function of the target vehicle interior temperature and as a function of the at least one second external temperature;

the computing device (14) calculating at least one second additional expected partial power requirement for the vehicle (F);

the computing device (14) calculating a second expected resulting power requirement as the sum of the second partial air-conditioning power requirement and the at least one second additional partial power requirement;

the computing device (14) calculating a second expenditure of energy of the vehicle (F) along the second route based on a progression of the determined second expected resulting power requirement along said second route; and the navigation device determining an optimal route having a minimal expenditure of energy for the vehicle (F) from a set comprising the first and the at least one second route;

wherein the vehicle (F) is operated based on the defined optimal route.

8. The device according to claim 7, wherein the second data detection device (12) includes a wireless communication interface (16) for receiving at least some of the second data signals.

* * * * *